United States Patent [19]

Johnson et al.

[11] 4,399,885
[45] Aug. 23, 1983

[54] FLEXIBLE FILM AIR PALLET FOR MATERIAL MOVEMENT

[75] Inventors: Raynor A. Johnson; Ralph M. Barrow, Jr., both of Newark, Del.

[73] Assignee: American Industrial Research, Newark, Del.

[21] Appl. No.: 265,923

[22] Filed: May 21, 1981

Related U.S. Application Data

[62] Division of Ser. No. 48,111, Jun. 13, 1979, Pat. No. 4,298,083.

[51] Int. Cl.³ .............................................. B60V 1/00
[52] U.S. Cl. .................................................. 180/125
[58] Field of Search ...................... 180/125, 124, 116; 414/676

[56] References Cited

U.S. PATENT DOCUMENTS

| | | | |
|---|---|---|---|
| 3,161,247 | 12/1964 | Mackie | 180/124 |
| 3,281,963 | 11/1966 | Johnson | 180/125 X |
| 3,357,511 | 12/1967 | Mackie | 180/125 |
| 3,754,617 | 8/1973 | Duthion | 180/125 X |
| 3,760,899 | 9/1973 | Crossman | 180/125 |
| 3,834,556 | 9/1974 | Crimmins | 180/125 |
| 3,948,344 | 4/1976 | Johnson et al. | 180/124 |

*Primary Examiner*—John A. Pekar
*Attorney, Agent, or Firm*—Sughrue, Mion, Zinn, Macpeak & Seas

[57] ABSTRACT

A flexible film sheet underlying a backing member bearing a load and directly overlying a planar, fixed support surface and partially defining a plenum chamber, and having perforations within the flexible film sheet facing the support surface, extends laterally beyond the load to form an extension of the air plenum chamber. Air inlet means opens to the plenum chamber extension portion to effectively jack the load from the air inlet means laterally and automatically balance the load on the air pallet during jacking, while reducing the possibility of rupture of the flexible film sheet in the vicinity of the air inlet. An elongated perforated tube is sinuously disposed on the bottom of a rigid planar load or backing member to form the air pallet.

2 Claims, 2 Drawing Figures

FLEXIBLE FILM AIR PALLET FOR MATERIAL MOVEMENT

This is a division of application Ser. No. 48,111, filed June 13, 1979 now U.S. Pat. No. 4,298,083.

BACKGROUND OF THE INVENTION

1. Field of the Invention

This invention relates to planar, flexible film air pallets, and more particularly, to an improved low cost air pallet employing thin flexible film sheet material.

2. Description of the Prior Art

Recently, flexible film air pallets have come into vogue to permit relatively heavy loads to be transported across fixed, horizontal support surfaces, with minimal frictional restrain due to the air bearing existing between the pallet and that support surface. U.S. Pat. No. 3,948,344 issuing Apr. 6, 1976, to Raynor A. Johnson and William D. Fletcher and entitled "LOW COST PLANAR AIR PALLET MATERIAL HANDLING SYSTEM" is representative of such air pallets.

The present air pallet constitutes an improvement within this art. The air pallet of U.S. Pat. No. 3,948,344 may take the form of a single flexible film sheet which is fixed about its edges directly to a load and being perforated within an area lying beneath the load with air inlet means to one side of the film sheet and with air dispersion means incorporated within that structure to insure distribution of the air entering the inlet to all areas beneath the load for discharge through the multiple perforations within the flexible sheet.

In addition to the air dispersion means, it is necessary to provide means to insure jacking of the load, that is, raising of the load some vertical distance from the fixed support surface and the creation of the plenum chamber, all without ballooning of the air pallet and resultant tipping or excessive tilting of the load. A portion of the flexible film sheet at the edges of the load is preferably non-perforated such that initially with the load pressing the perforated portion of the flexible film sheet against the fixed support surface, in order for the air to escape, the load must be jacked to the extent that some edge perforations are exposed, that is spaced some distance from the fixed load support surface. The air escapes, at which point an equilibrium "jacked" position is reached where the load is supported several inches above the fixed support surface on an air film created between the loaded pallet and the fixed support surface. The load may then be moved frictionlessly horizontally relative to the fixed load support surface regardless of minor variations in contour, surface roughness or the like, both with respect to the fixed support surface and the load or air pallet.

Additional embodiments of the invention in U.S. Pat. No. 3,948,344 are directed to air pallets where a flexible film bag functions as the primary member of the air pallet, and is affixed to the lower surface of the load and bears perforations on the bag wall immediately facing the fixed load support surface, with an integral tube, extending from the side of the air bag and being coupled to a wand through which air under pressure is directed to pressurize the plenum chamber formed by the bag. In such cases, either internally or externally, air dispersion means must be provided to insure the distribution of air throughout the plenum chamber to accomplish jacking of the load and permit air escape through the perforations to define the air bearing for the air pallet supported load.

While the air pallet employing the flexible film sheet as a single layer of a laminated air pallet structure or where dual flexible sheets in the form of an air bag such as a plastic garbage bag may function totally to define the air plenum chamber for the air pallet, certain problems arise particularly where the flexible film sheets are relatively fragile. First, where the bag or similar structure terminates in an integral tube which is coupled in turn to a vacuum cleaner wand or similar metal tubular structure acting as a conduit for the air under pressure from a pack carried or vehicle carried compressed air source, there is a tendency for the air bag or flexible sheet to tear as a result of air-pressure induced stress occurring at the line of juncture between the tube or air inlet portion of the flexible film sheet or bag and the main portion of the film or sheet defining the plenum chamber. Secondly, where the air inlet opens to the air bag or flexible film sheet portion defining wholly or partially the plenum chamber, the jacking of the load and pillowing of the air bag or flexible film sheet portion of the air pallet has resulted in the tilting of the load in a direction towards that portion which is still pressed into contact with the relatively fixed load support surface, causing the load to be dumped from the air pallet. In addition, this increases severely the stress to the portion of the air pallet partially filled with air at relatively high pressure, particularly in the area of the inlet to the flexible film sheet or air bag.

Where the inlet tube to the flexible film sheet or to the air bag abuts directly a load bearing area, that is, opens up into a plenum chamber which is completely closed due to the press of the load on the surface area of the bag or flexible film adjacent the air inlet, jacking of the load in many cases simply cannot be achieved.

Further, it is under these circumstances, that there is a great tendency due to the high air pressure and zero flow conditions for the bag or flexible film sheet to rupture at the area where the air enters the same, particularly where the bag or flexible film sheet is provided with an integral tube acting as an air inlet to the plenum chamber.

SUMMARY OF THE INVENTION

The present invention constitutes an improvement in an air pallet for frictionless movement of a load supported thereon by a relatively rigid planar backing member, relative to an underlying generally planar, fixed support surface. The air pallet includes a flexible film sheet underlying the backing member and directly overlying the support surface and partially defining an air plenum chamber. A portion of the flexible sheet facing the support surface is perforated with the perforations unrestrictedly opening into the plenum chamber. Air dispersion means are provided for insuring air flow throughout the chamber when the pallet is under load and pressurized air is fed to the plenum chamber and means for controlling pillowing of the flexible sheet portion of the chamber to permit jacking of the backing member and the load sufficiently to permit the pallet to accommodate surface irregularities for both the load support surface and the backing member without ballooning. Air inlet means are provided to the plenum chamber for permitting air under pressure to enter the chamber for jacking the load and for discharge through the perforations to create a positive pressure air film between the thin flexible sheet and the fixed support surface.

The improvement resides in the thin flexible sheet including a portion extending laterally to one side of the load to form a plenum chamber extension portion outside of the air pallet load bearing area with the air inlet means carried by said flexible sheet extension portion and spaced from the air pallet load bearing area.

An elongated tube perforated on one face may be coil fixed to the bottom of a load or generally regid backing member to form another embodiment of the invention.

DESCRIPTION OF THE PREFERRED EMBODIMENT

Figure 1:
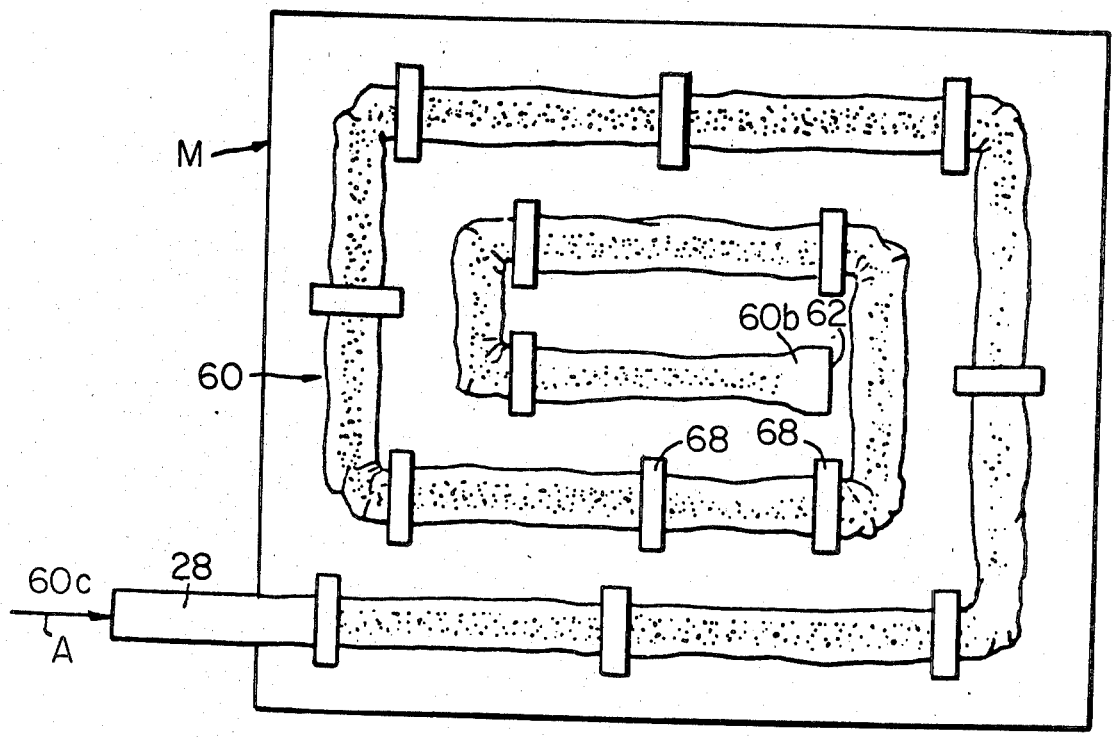
FIG. 1 is a bottom plan view of a one embodiment of the present invention.
Figure 2:
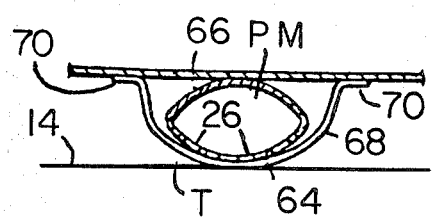
FIG. 2 is a sectional view of a portion of the embodiment of the invention of FIG. 1 taken about line 2—2.

Reference to FIGS. 1 and 2 disclose a fourth embodiment of the invention. In this case, the generally rigid backing member comprises a mat indicated generally at M, as for instance, a gym mat or the like having relatively large dimensions and wherein the mat is required to be moved over the surface of a gymnasium floor or the like. The bottom plan view of FIG. 1 shows the air pallet as taking the form of an elongated thin flexible material tube indicated generally at 60 being open at one end 70a and closed off at the opposite end as at 60b. The thin flexible material may constitute a plastic film, the plastic film being thermal bonded to define a seal, as for instance, along a seal line 62 terminating the end 60b of the tube. As seen in FIG. 2, small perforations as at 26 are provided to one face as at 64 of the tube, the opposite face 66 being non-perforated. Further, the tube is either wound in a loose coil form as shown in FIG. 1 or sinusoidal so as to distribute itself about the surface of the backing member M. The tube may be adhesively fixed to the backing member or as shown it may be threaded through a plurality of loops 68 which are fixed at opposite ends as at 70 to the mat, the loops 68 acting to receive loosely the tube 60 so as to be maintained in place, whether the tube 60 is subjected to air pressure via the inlet end 60a as indicated by the arrow A. With the air supply shut off, the tube 60 collapses such that the bottom of the backing member or mat contacts the rigid support surface 14, FIG. 8. When air pressure is supplied to the end of the tube 60a acting as the inlet means to the air pallet, and where the diameter of the tube 70 is sufficient, the filling of the inlet means 28 constituting an integral portion of the tube 70 at end 60a will cause progressively the tube 60 to expand such that the opposed walls 64 and 66 separate from each other, forming plenum chamber P with the air escaping through the small diameter perforations 26 to form an air bearing as at T between the tube bottom wall 64 and the generally rigid support surface 14. The tube functions to provide, particularly by way of inlet 28, the air dispersion means, while the nature of the perforations in contrast to the non-perforating portion of the tube controls the pillowing of the air pallet without affecting ballooning. Thus, the air pallet of FIGS. 1 and 2 has all the characteristics of the other air pallets constituting embodiments of this invention as well as the air pallets of the referred to patent to co-applicant.

From the above, it may be appreciated that with respect to the present invention, the air flows transversely and towards the load through the plenum chamber extension portion to progressively lift the load, distribute jacking of the load, and to provide automatic load balancing during movement of the same vertically relative to the flow or underlying fixed support surface. Where the air pallet in improved form takes configuration of a sinuous, wound or coiled tube located beneath the load to be transported such as gym mat, lift is applied over a significant surface area to substantially reduce the friction even though the gym mat may sag at one or more locations and contact the rigid support surface such as the floor intermediate of given runs of the sinuous tube.

Again, for the multiple embodiments, valving may be employed at each air inlet tube, this being necessary where there is more than one tube for supplying air to the air pallet plenum chamber. As in the invention of U.S. Pat. No. 3,948,344, the function of the air pallet is to first jack the load vertically upward to an extent determined by the pillowing control feature and the creation of a given height air film which maintains itself corresponding to the volume of air which escapes from the perforations, the air pressure within the plenum chamber P and the weight of the load 12 as well as the surface area supporting the same. The perforations are of relatively small diameter, as for instance pinholes, and extend cover a large surface area to automatically insure spreading of the air film over a maximum surface area, once the load is jacked and pillow height obtained.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An air pallet for frictionless movement of a load supported thereon by a relatively rigid planar backing member relative to an underlying generally planar fixed support surface, said air pallet comprising:
    a thin flexible tube underlying said backing member and directly overlying said support surface and defining internally a plenum chamber, the portion of said thin flexible tube facing said support surface bearing perforations with said perforations unrestrictedly opening into said plenum chamber,
    air dispersion means for insuring air flow throughout said plenum chamber when said pallet is under load and air is applied thereto under pressure,
    means for controlling pillowing of said thin flexible tube to permit jacking of the backing member and said load sufficient to permit the pallet to accommodate surface irregularities for both said load support surface and said backing member without ballooning, and
    air inlet means to the plenum chamber for permitting air under pressure to enter said chamber for jacking said load and for discharge through said perforations to create an air film between said thin flexible sheet and said fixed support surface;
    and wherein said thin flexible tube is of elongated form, non-looped, and being wound in loose coil or sinusoidal form about the bottom of said relatively rigid planar backing member with said perforations opening to opposite sides of said tube to permit air to freely escape from the plenum chamber to the atmosphere between the tube windings while providing a limited perforated surface area relative to the load bearing means defined by said backing member with the pressure of the air within the plenum chamber being sufficient to effect jacking of the load and creation of an air film between the perforated portion of the thin flexible tube and said fixed support surface.

2. The air pallet as claimed in claim 1, wherein said relatively rigid planar backing member bears a plurality of loops on the bottom surface thereof and said thin flexible tube is threaded through said loops and maintained on said relatively rigid planar backing member in coiled position thereon.

* * * * *